United States Patent [19]

Morikawa

[11] Patent Number: 5,020,504
[45] Date of Patent: Jun. 4, 1991

[54] FUEL INJECTION CONTROL SYSTEM FOR A TWO-CYCLE ENGINE

[75] Inventor: Koji Morikawa, Musashino, Japan

[73] Assignee: Fuji Jukogyo Kabushiki Kaisha, Tokyo, Japan

[21] Appl. No.: 395,952

[22] Filed: Aug. 18, 1989

[30] Foreign Application Priority Data

Aug. 30, 1988 [JP] Japan ................................ 63-216090

[51] Int. Cl.⁵ .......................................... F02M 67/02
[52] U.S. Cl. .................................. 123/531; 123/305; 123/65 BA
[58] Field of Search ............... 123/531, 532, 533, 534, 123/305, 65 BA, 65 B

[56] References Cited

U.S. PATENT DOCUMENTS

| | | | |
|---|---|---|---|
| 1,871,115 | 8/1932 | Cowardin et al. | 123/533 |
| 4,756,293 | 7/1988 | Suzuki et al. | 123/531 |
| 4,771,754 | 9/1988 | Reinke | 123/532 |
| 4,794,901 | 1/1989 | Hong et al. | 123/533 |
| 4,800,862 | 1/1989 | McKay et al. | 123/531 |

FOREIGN PATENT DOCUMENTS 62-93481 4/1987 Japan.

Primary Examiner—Andrew M. Dolinar
Attorney, Agent, or Firm—Martin A. Farber

[57] ABSTRACT

A two-cycle engine has an injector arranged for injecting fuel directly into a cylinder together with compressed air. The compressed air is injected from the injector after the closing of an exhaust port and before ignition, and fuel is injected in the stream of the compressed air in the injector within the period of the air injection.

9 Claims, 4 Drawing Sheets

FUEL INJECTION CONTROL SYSTEM FOR A TWO-CYCLE ENGINE

BACKGROUND OF THE INVENTION

The present invention relates to a two-cycle engine with a direct fuel injection system, and more particularly to a fuel injection control system with a two-stream injector.

In a two-cycle engine where fuel is mixed with air to make a combustible mixture and the mixture is supplied to a cylinder of the engine, a part of the fuel escapes from the cylinder through an exhaust port at the scavenging of the cylinder. A method is proposed to prevent fuel from escaping through the exhaust port, where air alone is delivered to the cylinder and fuel is injected directly to the cylinder by an injector. However, since the fuel injection occurs during the compression stroke, the fuel must be injected at a high pressure. Accordingly, there has been proposed a fuel injection system where fuel is injected by a two-stream injector with compressed assist air.

Japanese Patent Laid-Open 62-93481 discloses an injection control system in which a measured amount of fuel is accumulated in the injector before the fuel injection, and then the accumulated fuel is injected by compressed air at the opening of an injection valve. Additional fuel is further injected during the air injection. The irregular fuel injection is intended to charge stratification near layers around the spark plug. An experimental laser beam measurement of gas flow in the cylinder in the conventional system showed that gas flow largely fluctuates in each cycle. Accordingly, the stratified charge is moved at every cycle, so that uniform combustion does not occur.

Further, a larger amount of fuel is injected at the first injection compared with the second injection. Consequently, the injected fuel is not uniformaly mixed with air. In addition, residual gases remain in the cylinder and the fuel is injected in the mixture of fresh air and the residual gases. Consequently, the amount of the fresh air is small, which makes it difficult to ensure the stable ignition of the fuel.

SUMMARY OF THE INVENTION

The object of the present invention is to provide a fuel injection control system which is capable of improving pulverization of fuel and providing a stratified charge at low engine load.

BRIEF DESCRIPTION OF DRAWINGS

With the above and other objects and advantages in view, the present invention will become more clearly understood in connection with the detailed description of a preferred embodiment, when considered with the accompanying drawings, of which.

DETAILED DESCRIPTION OF THE PREFERRED EMBODIMENT

Figure 1:
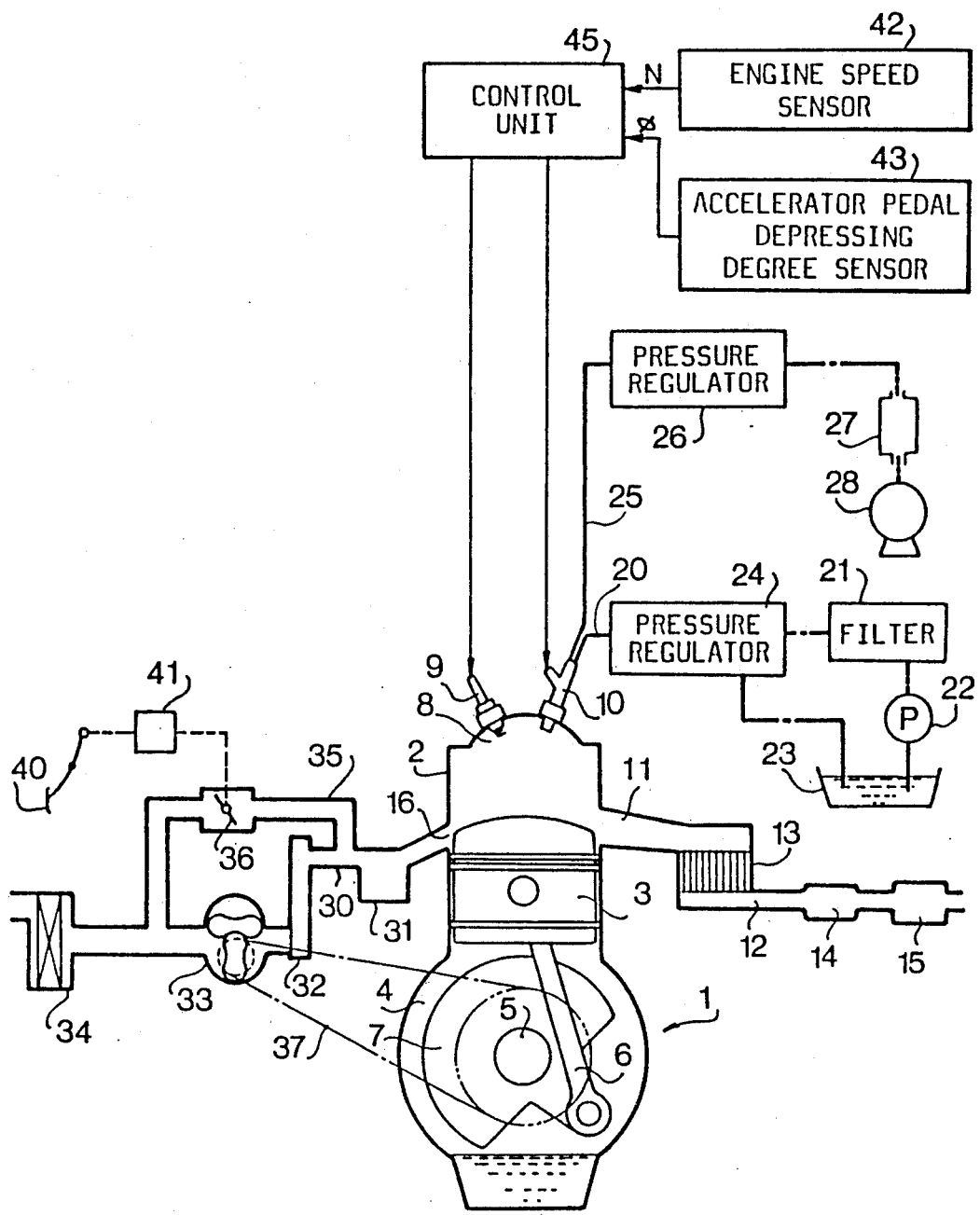
FIG. 1 is a schematic diagram of a two-cycle engine of the present invention.

Referring to FIG. 1, a two-cycle engine 1 comprises a cylinder 2, a piston 3 provided in the cylinder 2, a connecting rod 6 connected with the piston 3 and a crankshaft 5 disposed in a crankcase 4. A counterweight 7 is mounted on the crankshaft 5 so as to reduce the inertia of the piston 3 reciprocating in the cylinder 2.

In a wall of the cylinder 2, an exhaust port 11 and a scavenge port 16 are formed at 90 degrees angular disposition or opposing one another. The ports 11 and 16 are adapted to open at a predetermined timing with respect to the position of the piston 3.

A two-stream injector 10 and a spark plug 9 are provided on a top of a combustion chamber 8 of the cylinder 2. The injector 10 is a type where a predetermined amount of fuel is injected together with air by compressed air in the form of an air-fuel mixture. Fuel in a fuel tank 23 is supplied to the injector 10 through a fuel passage 20 having a filter 21, a pump 22 and a pressure regulator 24 for constantly maintaining the fuel at a predetermined low fuel pressure. The fuel is mixed with air supplied to the injector 10 through a compressor 28 passing through an air passage 25 having an accumulator 27 and a pressure regulator 26.

The engine 1 is supplied with air through an air cleaner 34, a displacement scavenge pump 33, an intercooler 32 for cooling scavenge air, and an intake pipe 30 having a scavenge chamber 31 for absorbing scavenge pressure waves when the scavenge port 16 is opened or closed. A bypass 35 is provided around the scavenge pump 33 and the intercooler 32. The bypass 35 is provided with a control valve 36. Exhaust gas of the engine 1 is discharged passing through the exhaust port 11, an exhaust pipe 12 having a catalytic converter 13, an exhaust chamber 14 and a muffler 15.

The scavenge pump 33 is operatively connected to the crankshaft 5 through a transmitting device 37 comprising an endless belt running over a crank pulley and a pump pulley. The scavenge pump 33 is driven by the crankshaft 5 through the transmitting device 37 for producing a scavenge pressure. An accelerator pedal 40 is operatively connected with the control valve 36 through a valve controller 41. The opening degree of the control valve 36 is controlled by the controller 41 so as to be inversely proportional to the depressing degree of the accelerator pedal 40. Further, an engine speed sensor 42 and an accelerator pedal depressing degree sensor 43 are provided for determining engine operating conditions.

Output signals from sensors 42 and 43 are supplied to a control unit 45 which feeds an ignition signal, an air injection pulse signal and a fuel injection pulse signal to the spark plug 9 and the injector 10, respectively.

Figure 2:
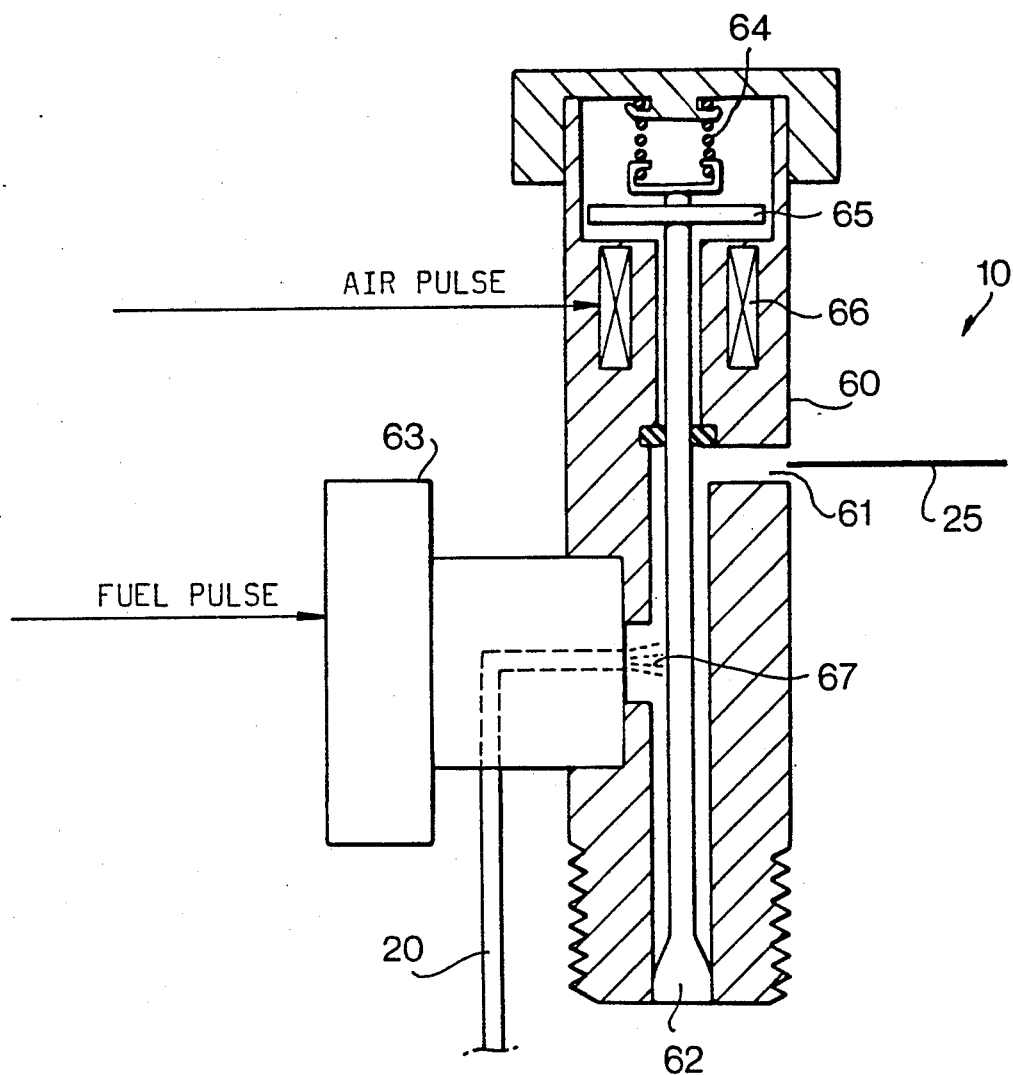
FIG. 2 is an enlarged sectional view of an injector.

The two-stream injector 10 is explained in the FIG. 2 in detail. The injector 10 comprises a body 60 having an air passage 61 formed therein, and a fuel injector 63 attached to a side of the body to communicate with the passage 61 through a passage 67. A poppet valve 62 is provided in the air passage 61 and an armature 65 is secured to an inner end of the poppet valve 62 which is downwardly urged by a spring 64 to close the air passage 61. The poppet valve 62 opens when a solenoid 66 is energized to attract the armature 65. Compressed air is constantly supplied into the air passage 61 through the air passage 25 and is injected when the valve 62 opens in accordance with an air pulse signal.

On the other hand, a certain amount of fuel is supplied to the fuel injector 63 according to a fuel pulse signal through the fuel passage 20 and accumulated therein. The fuel injector 63 having a high injection rate and a delayed injection is appropriate to stratify the combustion for the 2-stroke engine with high frequency. An injector having a wide dynamic-range such as a single point type injector for a four-cycle engine is applicable.

Figure 3:
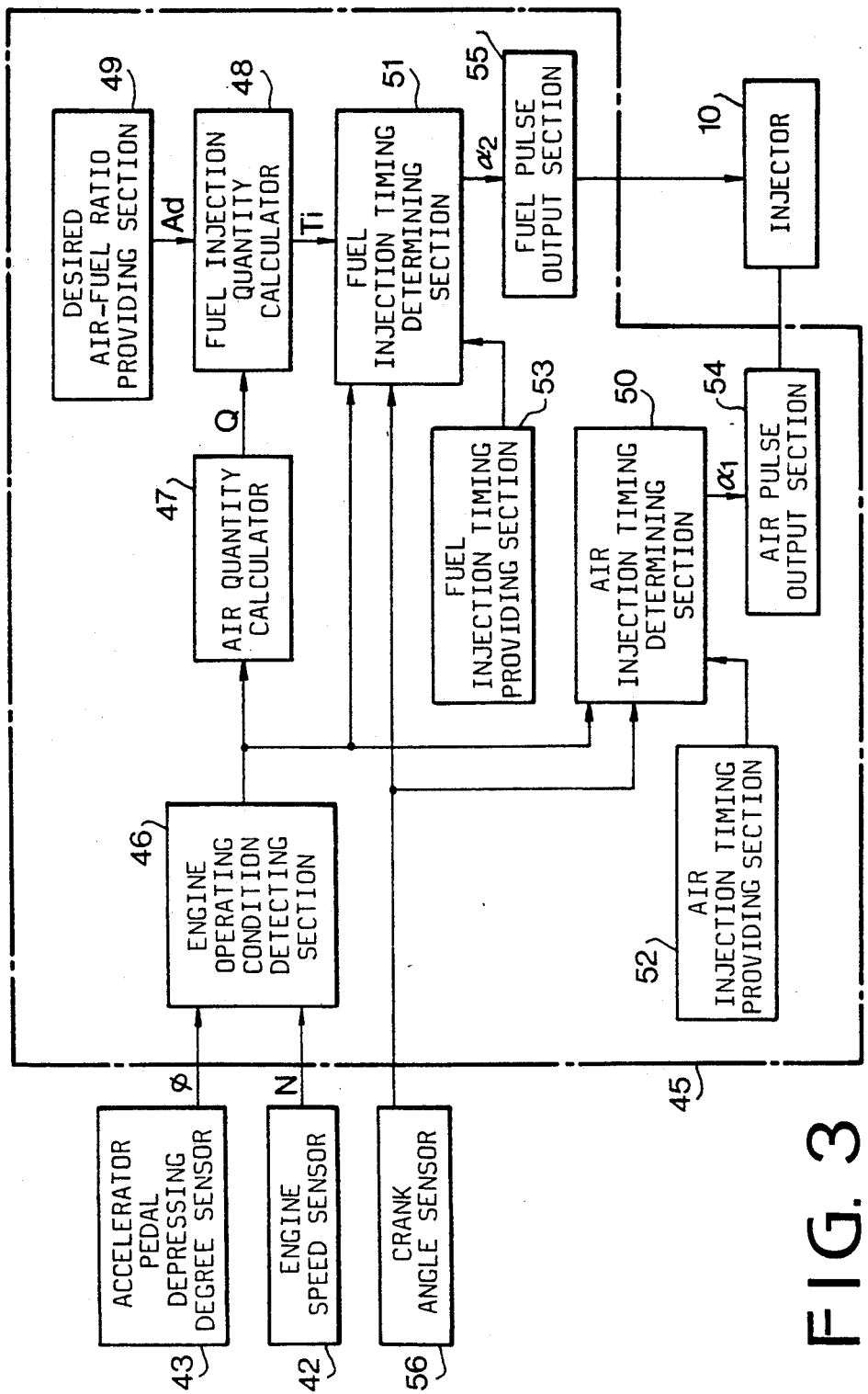
FIG. 3 is a block diagram showing a control unit according to the present invention.

Referring to FIG. 3, the control unit 45 comprises an engine operating condition detecting section 46 to which engine speed N and accelerator pedal depressing degree $\phi$ are applied. An output signal of the detecting section 46 is fed to an air quantity calculator 47 where air quantity Q in the cylinder 2 is calculated based on the engine speed N and accelerator pedal depressing degree $\phi$, while taking into account quantities of escape air during scavenging and compressed air injected with the fuel. The air quantity Q is fed to a fuel injection quantity calculator 48. In the fuel injection quantity calculator 48, a fuel injection quantity Ti is calculated from the equation, $Ti = Q/Ad$ where Ad is a desired air-fuel ratio (stoichiometry). The desired ratios Ad are stored in a table in a desired air-fuel ratio providing section 49, arranged in accordance with the engine operating conditions. An output signal representing the quantity Ti is applied to a fuel injection timing determining section 51.

Output signals of a crank angle sensor 56 and the engine operating condition detecting section 46 are fed to an air injection timing determining section 50 and to the fuel injection timing determining section 51. The section 50 determines timing for injecting air in dependency on data derived from a table provided in an air injection timing providing section 52. Similarly, the section 51 determines timing for injecting fuel in accordance with data derived from a table in a fuel injection timing providing section 53.

Figure 4:
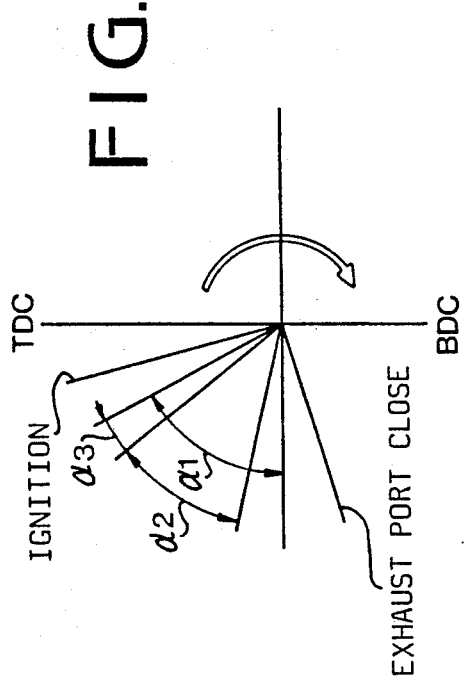
FIG. 4 is a diagram showing durations of injections of air and fuel.

As shown in FIG. 4 an air injection period $\alpha_1$ is set so as to start to inject air after the exhaust port 11 is closed and to end before the ignition. The air pulse signal of the timing is sent from an air pulse output section 54 to the solenoid 66 of the injector 10. On the other hand, a fuel injection period $\alpha_2$ is set within the air injection period $\alpha_1$ so as to end to leave a short air injection period $\alpha_3$. The starting of the fuel injection period $\alpha_2$ is retarded as engine load reduces and the period is shortened with the reduction of the engine load. The fuel pulse signal is sent from a fuel pulse output section 55 to the fuel injector 63 of the injector 10.

The operation of the two-cycle engine is described hereinafter.

The air supplied from the scavenge pump 33 and cooled at the intercooler 32 is returned to the inlet side of the scavenge pump 33 through the bypass 35. Since the opening degree $\theta$ of the control valve 36 is controlled to be inversely proportional to the depressing degree $\phi$ of the accelerator pedal 40, when the depressing degree $\phi$ of the accelerator pedal is small, the control valve 36 is opened large. As a result, a large amount of air is returned to the inlet side of the scavenge pump 33. Thus, a small amount of air, which corresponds to the small accelerator pedal depressing degree, flows into the cylinder 2 for scavenging without causing pumping loss. As the depressing degree $\phi$ increases, the quantity of fresh air forced into the cylinder 2 increases with the closing of the control valve 36.

When the piston 3 reaches a position close to the bottom dead center as shown in FIG. 1, the scavenge port 16 opens as well as the exhaust port 11 so that intake air, the quantity of which depends on the position of the accelerator pedal 40, is delivered by the scavenge pump 33 into the cylinder 2 through the intercooler 32 and the scavenge port 16. Consequently, burned gas in the cylinder 2 is scavenged so that fresh intake air is admitted therein in a short time. During the compression stroke, the piston 3 rises, closing both ports 11 and 16. A dose of fuel accumulated in the injector 10 in accordance with the fuel injection pulse signal from the control unit 45 is injected by the compressed air, which is supplied in accordance with the air pulse signal, as air-fuel mixture. The mixture is swirling in the combustion chamber with the scavenging air and ignited by the spark plug 9 immediately before the top dead center. After the explosion, the piston 3 descends for the power stroke. Accordingly, the exhaust port 11 is opened so that burned gas in the cylinder 2 which is still under high pressure escapes. The piston 3 further descends, thereby returning to the afore-described intake stroke where the cylinder 2 is scavenged.

In the control unit 45, the engine speed N and the accelerator pedal depressing degree $\phi$ detected by the sensors 42 and 43, respectively, are fed to the engine operating condition detecting section 46 to detect the engine operating conditions. The air quantity calculator 47 calculates a quantity of air in the cylinder based on the detected engine operating conditions to produce air quantity Q. The air quantity Q and the desired air-fuel ratio Ad obtained in the desired air-fuel ratio providing section 49 are applied to the fuel injection quantity calculator 48 so that a fuel injection quantity Ti dependent on the engine operating conditions is calculated. A fuel injection pulse width signal representing the quantity Ti is fed to the fuel injection timing determining section 51.

Figure 5:
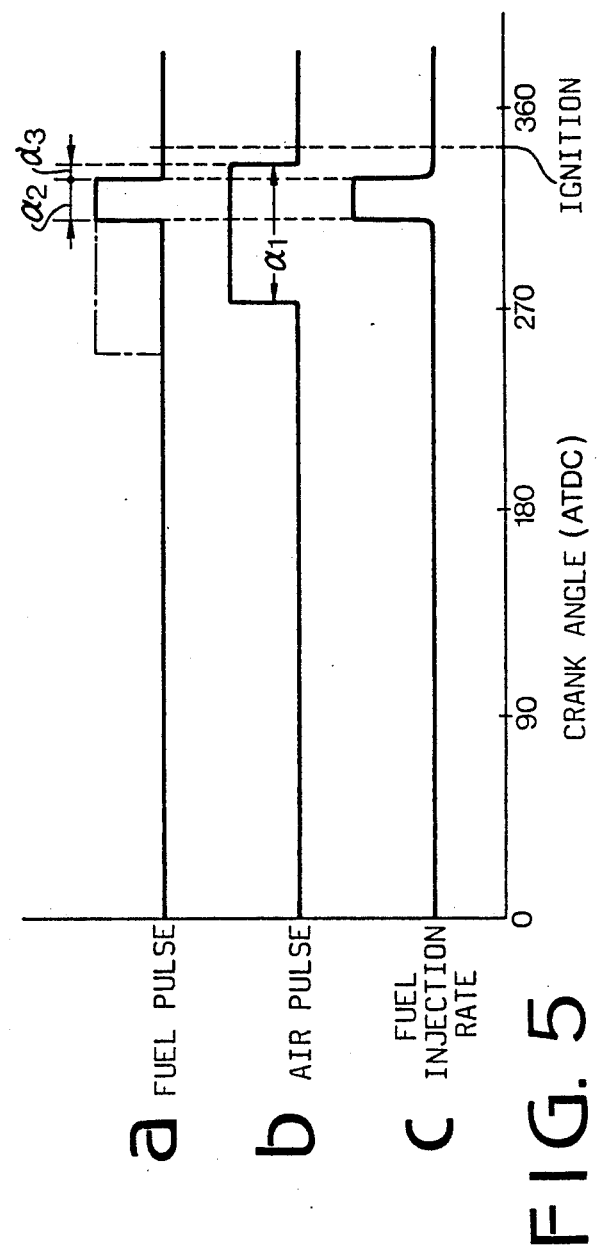
FIG. 5 is a timing chart showing air and fuel injection timing.

On the other hand, the air pulse signal is applied to the solenoid 66 of the injector 10 from the air injection timing determining section 50 through the output section 54 just after the exhaust port 11 is closed as shown in FIG. 5(b). Consequently, the solenoid 66 is excited to move the poppet valve 62 in the direction to open the air passage 61 to inject the compressed air into the cylinder before the fuel is injected.

In a light load range, the fuel pulse signal is sent to the fuel injector 63 from the fuel injection timing determining section 51 through the output section 55 after the start of the air injection as indicated by the solid line in FIG. 5(a). Thus, the accumulated fuel in the fuel injector 63 is entrained on the air stream. Since the fuel is injected into the cylinder with the injected air, the injection rate becomes constant as shown in FIG. 5(c). Since the fuel is induced into the stream of air, the fuel is preliminarily mixed with the air and hence the pulverization of fuel in the cylinder is enhanced. Further, because the fuel is injected after the start of the air injection, air fuel mixture containing plenty of fresh air is produced, although residual gases remain in the cylinder.

Further, the fuel injection is carried out at a delayed timing near the top dead center, so that the pressure in the cylinder increases up to a high pressure. Consequently, the injected mixture stays in an upper zone in the cylinder to form a thick mixture stratum.

A small amount of compressed air is injected during the air injection period $\alpha_3$ after the fuel injection finishes, so that no fuel is left in the injector 10 at the starting of the next cycle. Thereafter, the air injection stops and the air fuel mixture is ignited by the spark plug 9. Since the fuel is sufficiently pulverized and a rich mixture stratum including fresh air is formed in the vicinity of the spark plug, a stable combustion of the mixture is performed.

Under a heavy load condition, the fuel pulse signal starts injecting fuel before the air injection as indicated by the dot-dash line in FIG. 5(a) because it takes a long period to inject more fuel. Thus, fuel is widely (with respect to crank angle) injected into the cylinder simultaneously with the compressed air. Since the fuel is uniformly distributed in the cylinder, air is sufficiently used to burn the fuel, thereby increasing the power of the engine.

From the foregoing, it will be understood that the present invention provides a fuel injection control system for a two-cycle engine where the fuel is injected after the start of air injection, so that a rich air-fuel mixture including fresh air is stratified in the vicinity of a spark plug and the injected fuel is finely pulverized. Thus, the fuel is effectively burned, thereby improving fuel consumption and emission.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. In an air-fuel ratio control system for a two cycle engine having a cylinder with a scavenge port and an exhaust port, an intake passage communicating with said scavenge port, an exhaust passage connected to said exhaust port, a two-fluid type injector for directly separately injecting therein an amount of fuel and air for injection by the injector into said cylinder, a scavenge pump provided in said intake passage for supplying compressed air into said cylinder, and a throttle valve interposed in a bypass of said intake passage, the control system having a crank angle sensor provided at a crankshaft of the engine for detecting a crank angle of said crankshaft and for producing a corresponding crank angle signal, an engine speed sensor for detecting engine speed and for producing a corresponding engine speed signal, and an accelerator position sensor for detecting depressing degree of an accelerator pedal and for producing a corresponding degree signal, the accelerator pedal being operatively connected with said throttle valve, the improvement in the control system which comprises:

detecting means responsive to said engine speed and degree signals for detecting a corresponding of engine operating conditions as a function of said engine speed and said depressing degree of said accelerator pedal and for producing a corresponding engine operating condition signal;

a calculator responsive to said engine operating condition signal for calculating an air quantity and for producing a corresponding air quantity signal;

air injection timing determining means responsive to said engine operating condition signal and said crank angle signal for deciding an air injection timing and for producing a corresponding air pulse signal;

fuel injection timing determining means responsive to said air quantity, said engine operating condition, and said crank angle signals for deciding a fuel injection timing and for producing a corresponding fuel pulse signal; and said two-fluid type injector being responsive to said air and fuel pulse signals for injecting the fuel directly into a stream of air as the air is passing through the injector within a period of air injection from the injector into said cylinder after starting of the air injection during a light load range for injecting said fuel and air into said cylinder so as to form a stratified stream of said fuel and air and to effect complete combustion in said cylinder in all of the respective of said engine operating conditions.

2. The system according to claim 1, wherein:
   said injector injects the fuel before the end of the air injection.

3. The system according to claim 1, wherein:
   said injector retards starting of the fuel injection with decrease of engine load.

4. The system according to claim 3, wherein
   said injector shortens a period of injecting the fuel with decrease in the engine load.

5. The system according to claim 1, wherein
   said injector continues to inject a small amount of air after the fuel injection ends, said small amount of air injection stopping prior to ignition.

6. The system according to claim 1, wherein
   said injector increases injection of the fuel over a wider crank angle at a heavier load condition starting the fuel injection before the air injection under a heavy load condition.

7. The system according to claim 1, wherein
   the injection rate of the fuel is constant.

8. The system according to claim 1, wherein
   the fuel injection is at a delayed timing near top dead center of the crank angle.

9. The system according to claim 1, wherein
   said injector starts injecting the air passing through the injector into the cylinder after closing of the exhaust port and stops said injecting before ignition.

* * * * *